United States Patent [19]

VanDenberg

[11] Patent Number: 5,778,798
[45] Date of Patent: Jul. 14, 1998

[54] LIFT AXLE SUSPENSION FOR LARGE VOLUME TRAILERS

[76] Inventor: Ervin K. VanDenberg, 7130 Lutz Ave., N.W., Massillon, Ohio 44646

[21] Appl. No.: 393,817

[22] Filed: Feb. 24, 1995

[51] Int. Cl.$^6$ ..................................................... B61C 11/00
[52] U.S. Cl. ...................... 105/215.2; 105/72.2; 280/711
[58] Field of Search ............................ 105/215.2, 215.1, 105/72.2, 453; 180/209; 280/704, 711, 414.5, 678, 683

[56] References Cited

U.S. PATENT DOCUMENTS

| | | | |
|---|---|---|---|
| 3,140,880 | 7/1964 | Masser | 280/124 |
| 3,342,141 | 9/1967 | Browne | 105/215.2 |
| 3,704,671 | 12/1972 | Horne | 105/215.2 |
| 3,771,812 | 11/1973 | Pierce et al. | 280/124 F |
| 3,892,187 | 7/1975 | White | 105/215.2 |
| 4,009,873 | 3/1977 | Sweet et al. | 267/15 A |
| 4,114,923 | 9/1978 | Raidel | 280/711 |
| 4,132,432 | 1/1979 | Raidel | 280/711 |
| 4,309,045 | 1/1982 | Raidel | 280/711 |
| 4,530,515 | 7/1985 | Raidel | 280/704 |
| 4,615,539 | 10/1986 | Pierce | 280/690 |
| 4,955,292 | 9/1990 | Cripe | 105/215.2 |
| 5,058,917 | 10/1991 | Richardson | 105/215.2 |
| 5,083,812 | 1/1992 | Wallace et al. | 280/713 |

OTHER PUBLICATIONS

H-Beam Drive Axle Air Suspension, Hendrickson Turner. Truck Series, Turner Suspensions, Inc. 1987.
Reyco Air Suspensions –Reyco Transpro.
Ridewell's Self–Steering Sure–Trac Forward and Reverse Castering Suspension.
Davies Home of Trailing Axles –Davies Truck Equipment Limited.
T–TDC –Trailer Drop Center Axle Air Suspension –Turner Suspensions, Inc. 1987.

Primary Examiner—Robert J. Oberleitner
Assistant Examiner—C. T. Bartz

[57] ABSTRACT

A suspension assembly for a large volume trailer has a pair of spaced apart control arms pivotally mounted beneath the trailer. One end of each control arm is pivotally mounted to a hanger bracket suspended from the trailer frame, and another end of each control arm has an axle stub mounted thereto for receiving a tire wheel assembly. A stabilizer beam extends transversely between the control arms, and is mounted to each of the control arms intermediate the pivot and the axle stub. A lower beam, parallel to the stabilizer beam, extends between the axle stubs and a pair of air springs are mounted between the lower beam and the trailer frame. A center weldment is attached to the lower beam intermediate the air springs, and to the stabilizer beam intermediate the control arms. A lift mechanism is attached directly to the stabilizer beam and includes compression springs acting against force plates to move the tire wheel assemblies between ground engaging and non-ground engaging positions through an interconnected lift bar. The lift mechanism will raise the tire wheel assemblies between a non-ground engaging position, a first ground engaging position, and a second ground engaging position for use in roadrailer applications.

23 Claims, 6 Drawing Sheets

LIFT AXLE SUSPENSION FOR LARGE VOLUME TRAILERS

BACKGROUND OF THE INVENTION

1. Technical Field

The invention relates generally to an improved trailer suspension system. More particularly, the invention relates to a specialized lift axle suspension systems for use with large volume trailers. Specifically, the invention relates to lift axle suspension systems for selectively lowering and raising the wheels of a trailer into and out of engagement with the road surface, and raising the trailer to couple to a fixed height rail bogie.

2. Background Information

With the advent following World War II of large load carrying capacity trucks and trailers in this country, came the need to provide add-on axles for increasing the capacity of trucks over that of the chassis-cab design which was manufactured with a limited number of axles. While add-on axles effectively increased load carrying capacity, it was soon realized that as the number of load bearing axles increased on a given vehicle, a number of difficulties arose. Specifically, tire scuffing, loss in fuel economy and the inability to safely corner, all were problems associated with add-on type axles. Mitigation of these problems was a primary concern to the industry, which concern resulted in the development of the liftable axle suspension system. Such a suspension system could be selectively raised from the road surface or lowered into engagement with the road surface when needed, thereby mitigating the aforementioned problems.

The transportation of goods by truck continues to be a primary method of moving goods from one location to another. This commercial success is due to the large volume and load carrying capacity available in standard trailers as well as the highway system which reaches virtually every part of North America. However, in order to assure that all manufactured trailers will travel easily on existing and newly constructed highways, trailer sizes have been standardized. Specifically, regulations have been passed which limit a trailers length, width and height. In an effort to increase the volume of the trailers, trailer manufacturers routinely dimension their trailers at the legal limit.

As competition in the trucking industry continues to grow, and as businesses continue to demand quicker, cheaper methods of transporting goods, the need for large volume trailers has continued to increase. Inasmuch as the height, width and length of trailers are defined by regulation, the only remaining avenue to increase the trailers volume is to lower the trailers floor. While lowering the floor will increase the trailer volume, it significantly reduces the area in which the axles, wheels, tires and suspensions are retained. Smaller tires and rims are used on these trailers to accommodate the lower trailer floor. Similarly, suspension systems have been significantly altered to assure that the system will function properly when positioned in the smaller space between the trailer floor and the road surface.

The use of large volume trailers amplifies the need for lift axles to be positioned under the trailer as the trailer themselves are able to carry more volume, and consequently, more weight. However, the lowered trailer floors substantially limits the suspensions which may be used under the trailer. Many existing lift axle suspensions which have been developed are too large to fit in the reduced space under these trailers. As a result, specialty suspensions have been developed to fit this particular need.

Similarly, as the need continues to grow for inexpensive and reliable transport of goods, so does the popularity of roadrailer suspensions such that the trailer may be supported on the trailer suspension, or alternatively on a fixed height rail bogie. A rail bogie generally includes a frame which supports at least two rail car wheels rotatably mounted on an axle. The upper portion of the frame includes a latching mechanism which is complementary related to a similar latching mechanism on the underneath of the trailer such that the trailer may be raised up via a roadrailer suspension, positioned over the rail bogie, and lowered into engagement with the latching mechanism thereon. The axle of the roadrailer suspension is then raised out of engagement with the railroad surface, with the rail bogie providing the suspension and wheels for use on railroad tracks.

Roadrailer suspensions utilize a lifting mechanism which can either be an air spring, or a mechanical spring of the leaf or coil variety. The conventional axle lifting mechanism comprises one or more stressed mechanical springs such as coil springs acting directly between the vehicle frame and axle. When air is relieved from the air springs, the mechanical springs raise the axle. The mechanical springs, in their condition of diminished stress when the axle is fully raised, must still exert sufficient force to support the weight of the axle and associated tires such that the tires remain in the raised position. When the air springs are pressurized, the wheels are forced downwardly into ground engagement overcoming the load forces and mechanical lift spring forces. In the roadrailer application, the axle is moved between three separate positions: a first ground engaging position when the roadrailer suspension is operating in highway mode, a second ground engaging position, or transfer mode, when the trailer is raised to engage a rail bogie in coupling mode, and a rail mode where the trailer is supported on a rail bogie and the tires are lifted out of ground engaging position.

It is apparent from a review of the above discussion, the size of the air spring necessary to move the suspension between the above three positions is significant. The problem associated with utilizing a large air spring under a trailer is especially pronounced when roadrailer suspensions are utilized with high volume trailers as the distance between the trailer floor and the top of the axle is insufficient to house an air spring having sufficient size and capacity to raise the trailer for coupling to a rail bogie. The space limitations under a large volume trailer are further taxed in that the load carrying capacity of an air spring decreases as the air spring moves from the collapsed to the expanded position. As such, the air springs of the present invention must be of sufficient size to assure that when the air springs raise the trailer to the transfer mode, the spring is not so far expanded that the trailer weight exceeds the air spring lift capacity at the associated expanded spring height.

More specifically, air springs are usually required to carry the largest loads when in the partially or fully collapsed position, and to carry the smallest loads when in the fully expanded position. The requirements of the present invention are thus exactly opposite of the usual requirements of an air spring. When the air spring of the present invention is collapsed, and the roadrailer suspension is in the non-ground engaging position, the air spring supports no load. However, when the air spring is expanded to the transfer mode position, the air spring is expanded a significant distance and is required to lift the largest load, the entire trailer weight. Such use requires an air spring of a significantly larger height than the distance the air spring must expand as the air spring must remain in a large load carrying range to assure that the spring will support the trailer weight when moving the trailer to the transfer mode position. While existing suspension systems are presumably adequate for the purpose for which they are intended, previous suspensions for use under high volume trailers have insufficient travel and load carrying and lifting capacity for the suspension to move between the above described three positions.

Therefore, a need exists for a lift axle suspension which may be moved between a highway ground engaging position, a transfer position, and a non-ground engaging lifted position when mounted beneath a high volume trailer. Further, the need exists for a roadrailer suspension which is positioned beneath a high volume trailer and which offers sufficient travel and load carrying and lifting capacity to raise the trailer for coupling to a rail bogie.

SUMMARY OF THE INVENTION

Objectives of the invention include providing a lift axle suspension which may be positioned beneath a high volume trailer.

Another objective of the invention is to provide a lift axle suspension in which the air springs have been moved inward of the control arm.

A further objective of the invention is to provide a lift axle suspension in which air springs are located between the axle stubs such that air springs of sufficient size and capacity may be utilized to move the suspension between a ground engaging and non-ground engaging position.

Yet another objective of the invention is to provide a lift axle suspension in which the central portion of the axle has been removed, and a stabilizer beam extends forward of the axle, and between the control arms.

Yet a further objective of the invention is to provide a roadrailer suspension which may be mounted beneath a high volume trailer.

A still further objective is to provide such a roadrailer suspension which has sufficient travel and capacity to raise the high volume trailer to a position for coupling to a rail bogie.

Yet another objective of the invention is to provide such a lift axle suspension which is of simple construction, which achieves the stated objectives in a simple, effective and inexpensive manner, and which solves problems and satisfies needs existing in the art.

These and other objectives and advantages of the invention are obtained by the improved lift axle suspension system, the general nature of which may be stated as including a pair of spaced apart control arms, each having an end; pivot means attached to one of the ends of each control arm for providing pivotal movement of the control arm relative to the frame; a stub axle mounted on each control arm a spaced distance from the pivot means; and a stabilizer beam extending between the control arms intermediate the pivot means and the stub axles.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
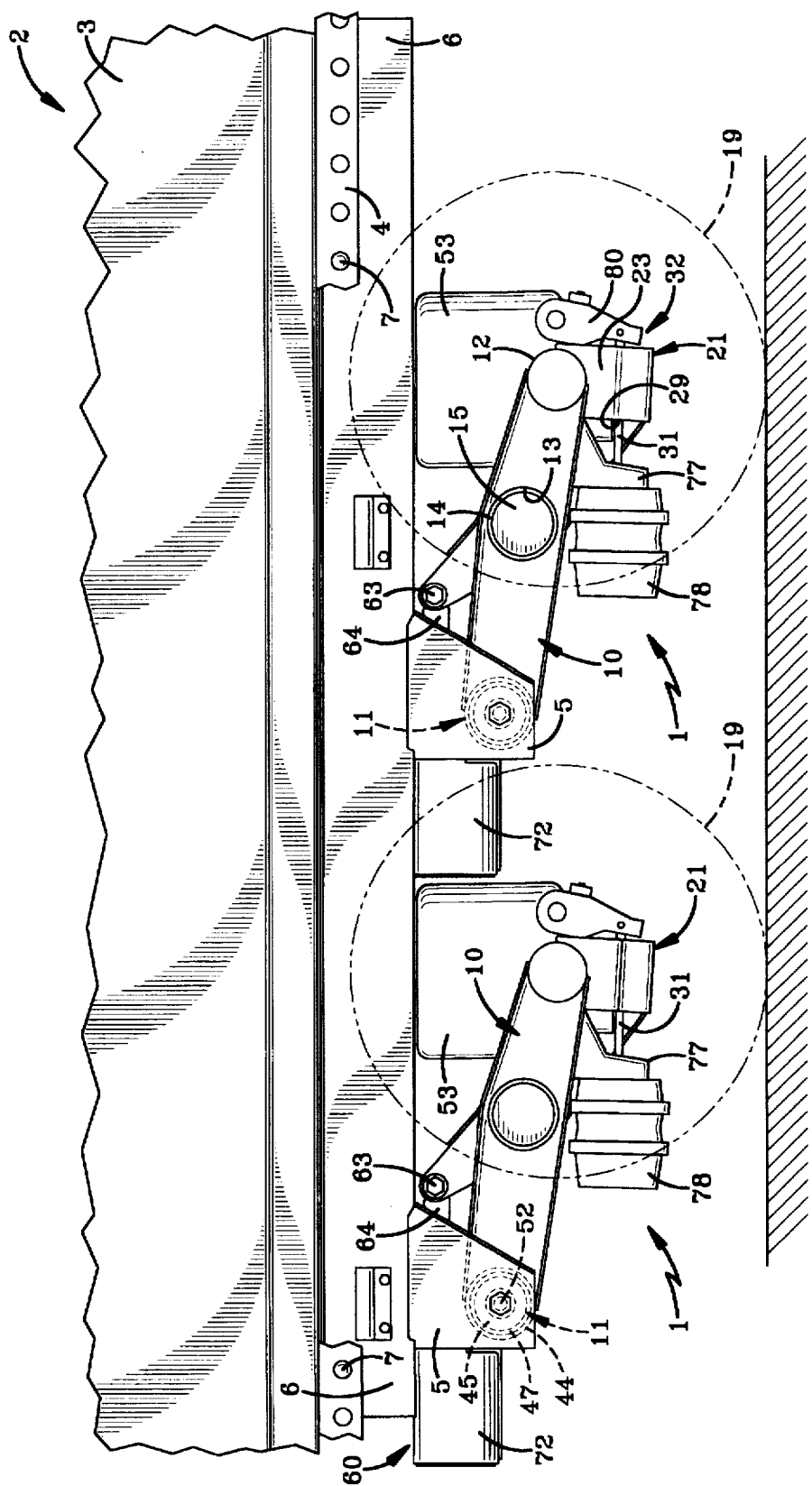
FIG. 1 is a side elevational view of the lift axle suspension system of the present invention with the tires shown in dot-dash lines, and shown attached to a trailer.
Figure 2:
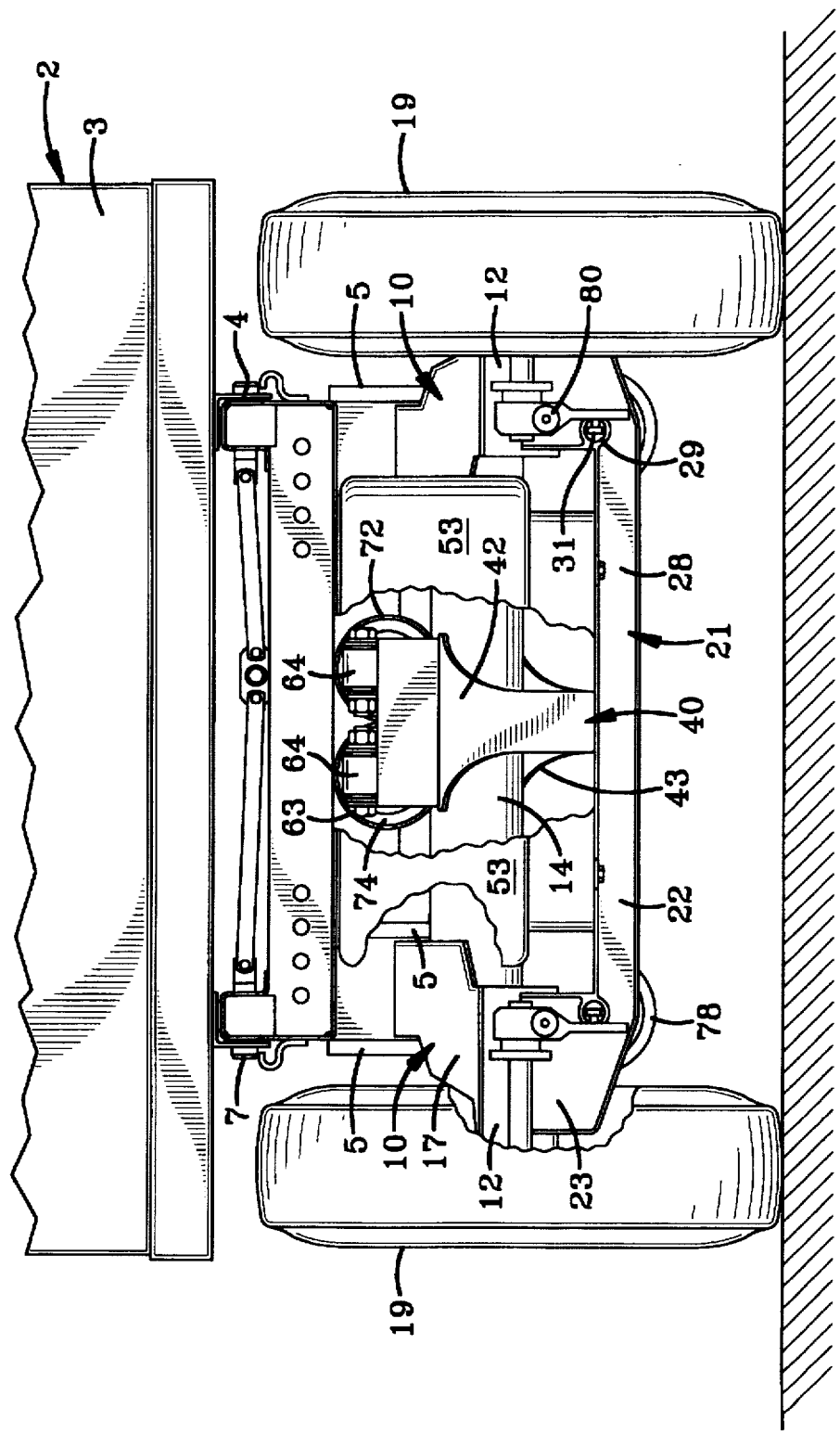
FIG. 2 is a rear elevational view of the lift axle suspension shown in FIG. 1 with portions broken away.
Figure 3:
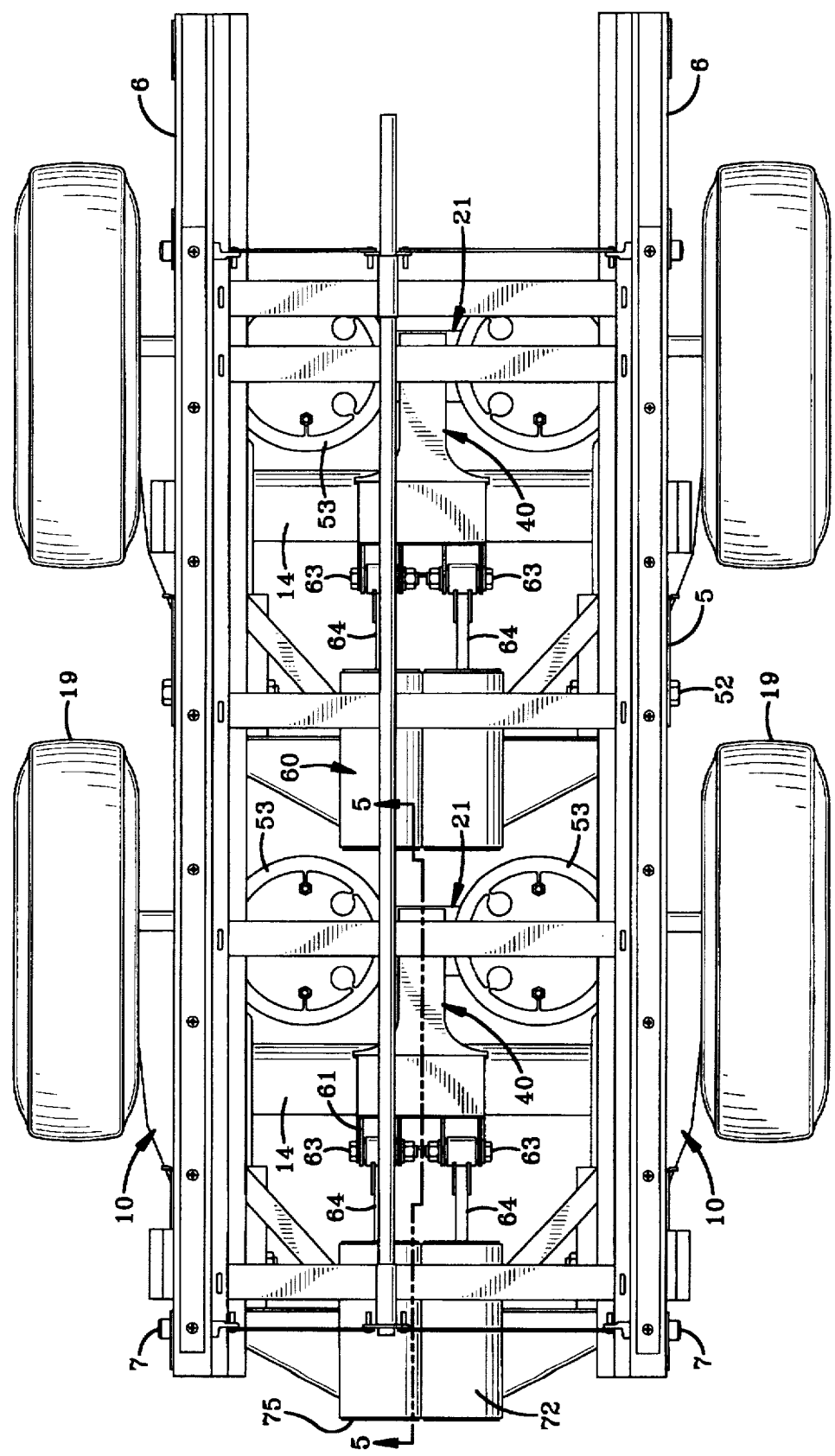
FIG. 3 is a top plan view of the lift axle suspension system shown in FIG. 1 with the cargo box removed.

The improved suspension system of the present invention is indicated generally at 1, and is particularly shown in FIGS. 1, 2 and 3 mounted on a trailer 2. Trailer 2 includes a cargo box 3 supported by a pair of frame rails 4 extending longitudinally along the length of trailer 2. Suspension system 1 includes a pair of hanger brackets 5 welded to a pair of parallel and spaced apart slide channels 6. Slide channels 6 are spaced apart a distance equal to the distance between frame rails 4 and are mounted to frame rails 4 with a plurality of mounting pins 7. Referring to FIG. 1, a pair of identical suspension systems 1 are shown installed on trailer 2, with only one being described in detail below.

Figure 4:
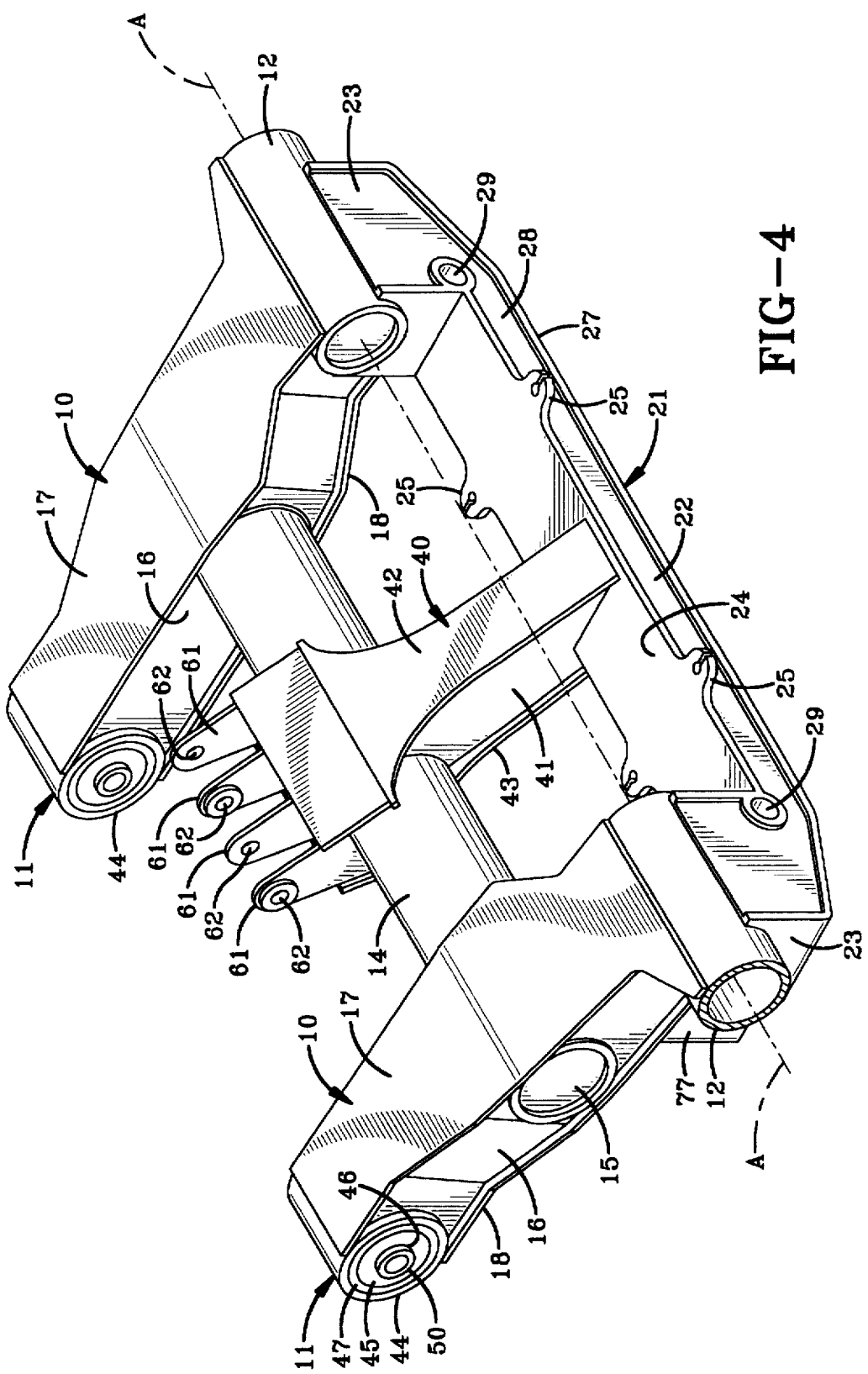
FIG. 4 is a perspective view of the lift axle suspension system of the invention shown with the lift mechanism and air springs removed and with the stub axle in section.

Suspension system 1 includes a pair of parallel and spaced apart control arms 10 (FIGS. 1 and 4). One end of each control arm 10 is mounted to a respective hanger bracket 5 at a pivot 11, and an opposite end of each control arm 10 is welded to a stub axle 12. Each stub axle 12 has a tire-wheel assembly 19 rotatably mounted thereon. Each control arm 10 is also formed with a circular hole 13 intermediate pivot 11 and stub axle 12 for receiving an end of a cylindrical stabilizer beam 14. Stabilizer beam 14 extends through each hole 13 and is perpendicular to each control arm 10 and is capped at each end with a cap plate 15.

Control arms 10 are formed by a pair of spaced apart sidewalls 16, a top wall 17 and a bottom wall 18 (FIG. 4) which define a hollow interior.

In accordance with one of the main features of the present invention, a lower beam 21 (FIGS. 1 and 4) extends between stub axles 12 and is parallel to stabilizer beam 14. Lower beam 21 is U-shaped and includes a horizontal section 22 and a vertical portion 23 extending upwardly from each end of horizontal section 22. Each vertical portion 23 is welded to a corresponding stub axle 12. Horizontal section 22 includes an upper wall 24 having a pair of mounting ears 25 extending outwardly from each longitudinal side thereof. Upper wall 24 is parallel to a center axis CL extending through each of stub axles 12, but is positioned below stub axle 12.

Lower beam 21 also includes a lower wall 27 and a pair of parallel and spaced apart sidewalls 28. Sidewalls 28 of lower beam 21 are each formed with one hole 29 adjacent each stub axle 12 for receiving a push rod 31 of a brake system 32 (FIG. 1).

Still referring to FIG. 4, a center weldment 40 extends between lower beam 21 and stabilizer beam 14. Center weldment 40 includes a pair of parallel and spaced apart sidewalls 41, a top wall 42 and a bottom wall 43 creating a rigid generally square beam. One end of center weldment 40 is complementary shaped to lower beam 21 and is welded thereto intermediate vertical portions 23. A second end of center weldment 40 is complementary shaped to stabilizer beam 14 and is welded thereto intermediate control arms 10. Control arms 10, stabilizer beam 14, lower beam 21 and center weldment 40 thus combine to form a rigid structure pivotally mounted to trailer 2 at pivots 11.

Each pivot 11 includes a bushing tube 44 welded to the end of a respective control arm 10 opposite stub axle 12. Pivot 11 further includes a flexible rubber bushing 45 formed with a hole 46 for receiving an inner sleeve 50 (FIG. 4) therein. Inner sleeve 50 is longer than rubber bushing 45 and extends outwardly beyond the ends thereof. Rubber bushings 45 are bonded to inner metal sleeves 50 which are press-fitted within respective bushing tubes 44. Each pivot 11 also includes a pivot pin 52 (FIG. 1) which passes through hanger bracket 5 and inner sleeve 50. Pivot pins 52 clamp the ends of inner sleeves 50 to prevent rotational movement between inner sleeves 50 and pivot pins 52. Inasmuch as pivot pins 52 are fitted into inner sleeves 50 of each rubber bushing 45 to prevent rotational movement therebetween, and each rubber bushing 45 is press-fit into a respective bushing tube 44 attached to control arm 10, any movement between control arm 10 and hanger bracket 5 occurs as a result of distortion in flexible rubber bushings 45 which provide relatively little lateral deflection, for example in a range of 0.12 inches to 0.25 inches.

A pair of air springs 53 (FIGS. 2 and 3) is mounted between lower beam 21 and frame rails 4 with one air spring being mounted over one mounting ear 25 on each side of lower beam 21. Each air spring is mounted to upper wall 24 of lower beam 21 via a bolt extending through each mounting ear 25 and into the respective air spring 53.

In accordance with one of the main features of the present invention, air springs 53 are mounted to upper wall 24 of lower beam 21 below stub axles 12 such that central axis CL extends through air springs 53 (FIG. 2). Moreover, each air spring 53 is mounted to lower beam 21 intermediate a stub axle 12 and central weldment 40.

Figure 5:
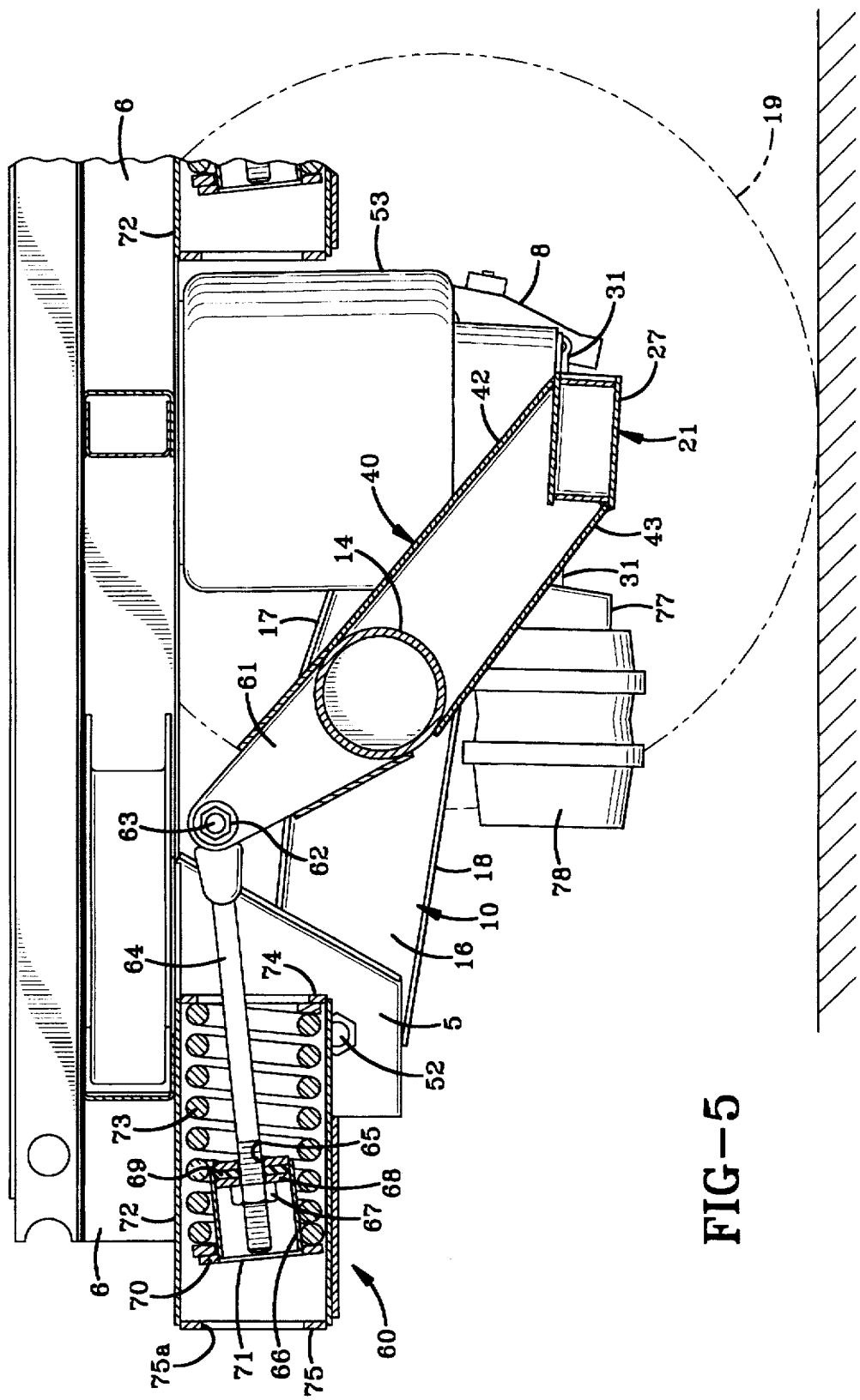
FIG. 5 is a sectional view of the lift axle suspension of the present invention taken substantially along line 5—5, FIG. 3, and shown in highway mode with the tires in dot-dash lines, and with the trailer broken away.

Two lifting mechanisms 60 are attached directly to stabilizer beam 14. Each lifting mechanism 60 includes a pair of brackets 61 (FIGS. 3–5) welded to stabilizer beam 14. Each bracket 61 is formed with a hole 62 formed in its outer end for receiving a bolt 63 (FIG. 5). Each lifting mechanism 60 also includes a lift bar 64 having one end extending between brackets 61 and pivotally mounted on bolt 63, and an opposite end received through an aperture 65 (FIG. 5) formed in the center of a spring cup 66. Each lift bar 64 is secured to spring cup 66 by an adjustment nut 67, a washer 68 and a bushing 69. Each spring cup 66 includes a peripheral flange 70 and an integral cup-shaped central portion 71 and is mounted within a tubular housing 72 which is secured to slide channels 6 with a cross-member 57.

Each lifting mechanism 60 also includes a coil spring 73 mounted within housing 72. One end of spring 73 abuts peripheral flange 70 of spring cup 66, while the other end of spring 73 bears against a force plate 74 of tubular housing 72. Forces exerted on spring cup 66 may be varied by adjusting the actual location of adjustment nut 67 along the threaded end of lift bar 64. Tubular housing 72 includes an end cover plate 75 having a hole 75a being formed therein to provide access to adjustment nut 47.

Referring to FIG. 1, a bracket 77 extends downwardly from each control arm 10 and a standard brake chamber 78 is mounted thereto. In accordance with one of the main features of the present invention, a push rod 31 extends outwardly from brake chamber 78, through hole 29 of beam 21, and is pinned to a slack adjuster 80. The movement of the push rod 31 operates to move the brake shoes toward or away from an associated brake drum (not shown). The inclusion of hole 29 in lower beam 21 thus permits push rod 77 to freely move therein and permits brake chamber 78 to be mounted closer to a respective control arm 10 than would be otherwise possible thus providing better ground clearance to suspension system 1.

Figure 6:
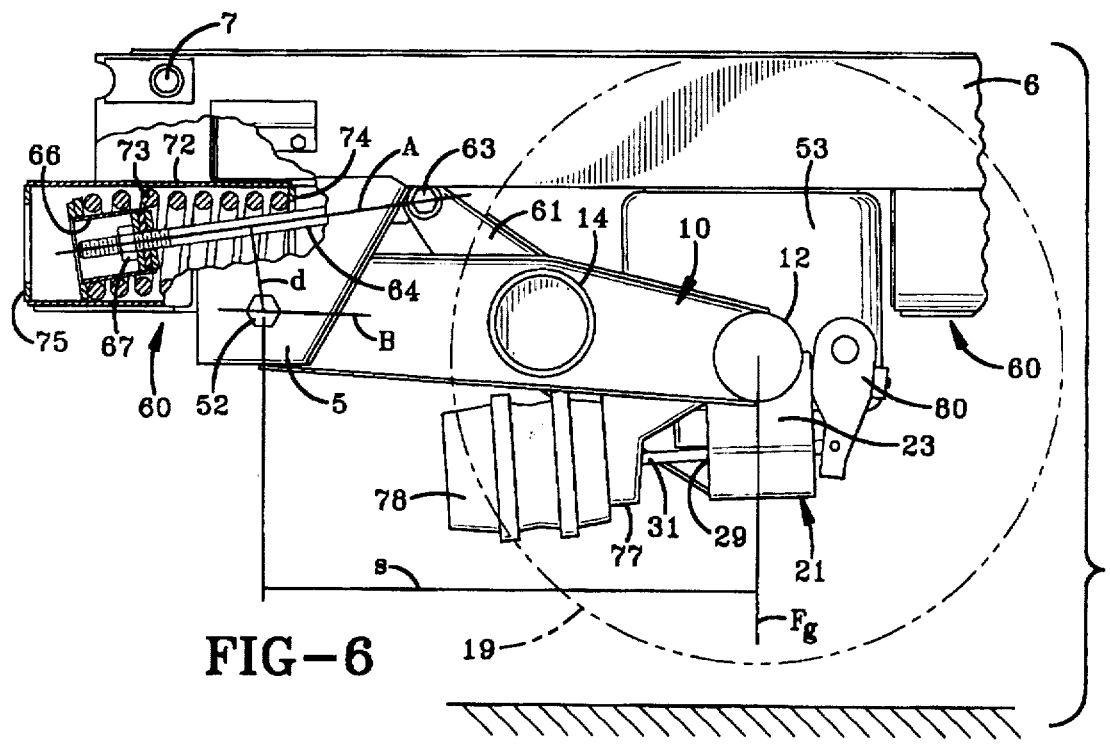
FIG. 6 is a side elevational view of the suspension of FIG. 1 shown with portions broken away and in rail mode.
Figure 7:
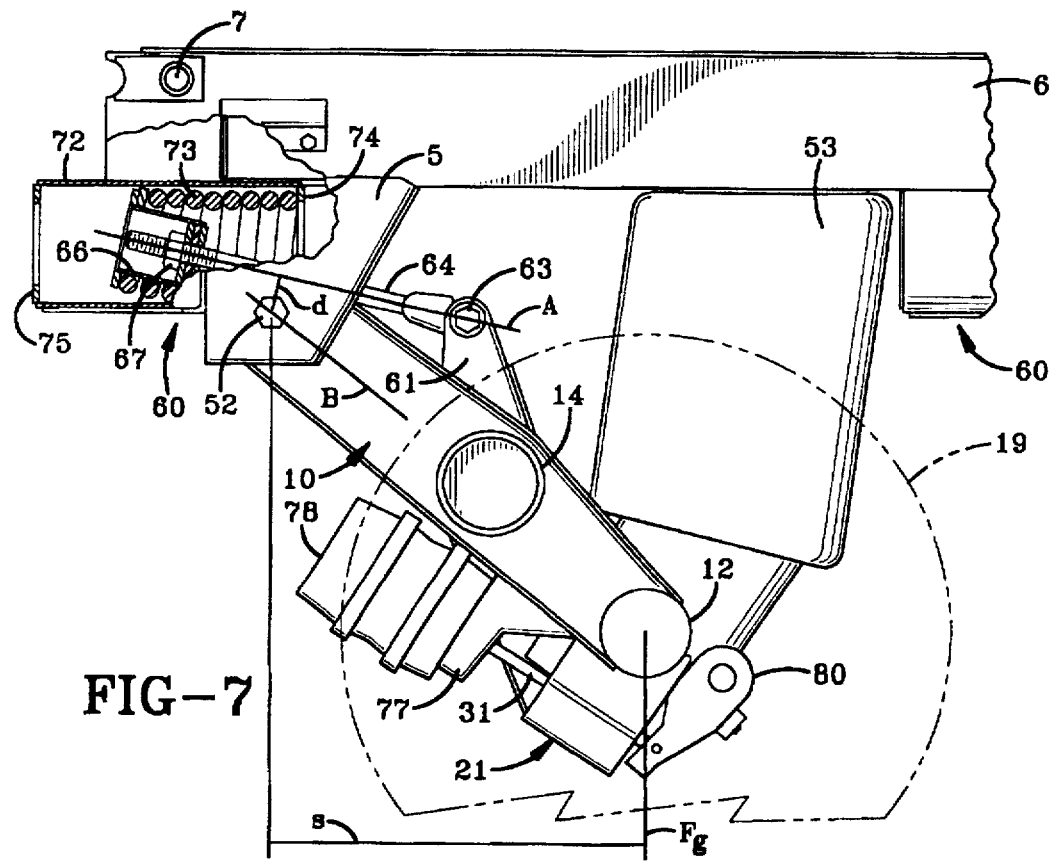
FIG. 7 is a side elevational view of the suspension shown in FIG. 6 in coupling mode.

The operation of lifting mechanism 60 is best illustrated in FIGS. 5, 6 and 7. Coil spring 73 is sufficiently prestressed to move axle stubs 12 and associated tire-wheel assemblies 19 to the lifted position (rail mode) (FIG. 6) and retain the same in the lifted position. When air springs 53 are deflated, coil springs 73 will push against force plates 74 and move stabilizer beam 14, interconnected axle stubs 12 and tire wheel assemblies 19 to the raised position of FIG. 6. Coil springs 73 provide the lifting force when they expand against force plates 74 to move spring cups 66, which in turn move interconnected lift bars 64. The force translated through lift bars 64 to stabilizer beam 14 moves axle stubs 12 to the position shown in FIG. 6.

When tire-wheel assemblies 19 are lowered into ground engaging position and the trailer's weight is transmitted thereto, air springs 53 are inflated to exert downward force on lower beam 21 and consequently on interconnected stabilizer beam 14. The downward movement of stabilizer beam 14 pulls lift bars 64 downwardly and compress coil springs 73 overcoming forces exerted thereby. As air springs 53 continue to inflate, and coil springs 73 continue to compress, axle stubs 12 and associated tire wheel assemblies 19 are moved into the ground engaging position as shown in FIG. 5. As each lift bar 64 moves downwardly, it will pull against an associated spring cup 66 to compress an associated spring 73 against force plate 74, and suspension system 1 will move to the first lowered position, or highway mode, shown in FIG. 5. When suspension system 1 is in highway mode only a portion of the air springs overall effective length is utilized, and tire-wheel assemblies 19 are spaced sufficiently far from frame rails 4 to allow trailer 2 to comfortably ride over the road surface.

When air springs 53 are further inflated, they exert a sufficient force on lower beam 21 to overcome the counter-acting forces exerted by coil springs 73. Stabilizer beam 14 and interconnected lift bars 64, are thus moved to a second lowered position, or coupling mode, shown in FIG. 7. Suspension system 1 is placed in the coupling mode shown in FIG. 7 when vehicle 2 is being coupled to a rail bogie. After coupling, air springs 53 are fully deflated to move suspension system 1 to the position shown in FIG. 6 as already described, thereby moving tire-wheel assemblies 19 out of ground engaging contact. After trailer 2 has been transported via the rail bogie, air springs 53 are reinflated to move suspension system 1 to the position shown in FIG. 7. Trailer 2 is then pulled away from the rail bogie, with the air springs then being partially deflated to the highway mode position shown in FIG. 5, for ground engaging contact to be pulled by a known tractor vehicle.

A further benefit received from the above described invention is that by mounting air springs 53 to lower beam 21 below axial centerline CL and axle stubs 12, air springs 53 will expand a sufficient length to permit suspension system 1 to move to the coupling mode shown in FIG. 7 while simultaneously supporting the load held in trailer 2. Moreover, inasmuch as air springs 53 are mounted directly in the line of action of forces acting on axle stubs 12, air springs 53 vertically stabilize vehicle 2 for use with larger loads. Still further, given that lower beam 21 is positioned beneath axle stubs 12, more room is provided to retain air springs 53 when in the compressed or deflated position shown in FIG. 6.

Suspension system 1 thus provides a trailing arm type suspension with all the advantages known in the art. Moreover, suspension system 1 provides a lift-axle system where air springs 53 act on lower beam 21 beneath the axial centerline CL of stub axles 12, such that air springs 53 move the tire-wheel assemblies between a ground engaging and non-ground engaging position while having sufficient room between lower beam 21 and frame rails 4 to retain air springs 53 when in the compressed position shown in FIG. 6. The invention also provides a roadrailer suspension which is movable between a non-ground engaging position (FIG. 6), a first ground engaging position (FIG. 5), and a second ground engaging position (FIG. 7) for utilization on a roadrailer vehicle.

When compared to a conventional trailing-arm suspension, the center portion of the transverse axle is completely removed in applicant's invention, leaving only axle stubs 12. This center portion of transverse axle has then been replaced by transverse stabilizer beam 14 intermediate pivot 11 and stub axles 12, lower beam 21 and center weldment 40 to provide an extremely roll rigid suspension system 1. The rigidity of suspension system 1 may then be relaxed by altering the deflection characteristics within rubber bushings 45. Suspension system 1 accomplishes the above desired objectives while simultaneously being sized to fit beneath a large volume trailer with a lowered trailer floor.

When spring 73 is in the position shown in FIG. 6 in its most compressed position, the force supplied by spring 73 is relatively low. However, this force acts through a lever arm, which lever arm is the distance, labeled d in FIG. 6, between the line of action of the force of spring 73 on bolt 63 and the line of action of pivot pin 52. More specifically referring to FIG. 6, the force supplied by spring 73 operates to create a force along a line of action A through a distance d relative to a line of action B acting through bolt 52. Conversely, when spring 73 is in its most compressed position (FIG. 7), such that it exerts the strongest force on lift bar 64, the distance d between the line of action A and line of action B is extremely small such that force exerted by spring 73 in FIG. 7 operate through an extremely small lever arm d.

Therefore, forces created by spring 73 in FIG. 6 while relatively low, are multiplied several times due to the distance d between the line of action A of the force of spring 73, and the line of action B of pivot pin 52. Conversely, while spring forces created by spring 73 in FIG. 7 are extremely large, they operate on nearly a one to one ratio as the line of action A of forces extending through bolt 63 and line of action B of pivot pin 52 are close such that distance d is small. Spring forces created by spring 73 in FIG. 7 are thus only marginally higher than those forces created in FIG. 6 due to the kinematic geometry of suspension system 1. As can be seen from FIGS. 6 and 7, there is significant lift capacity remaining in spring 73 when the suspension is in the position shown in FIG. 6 to assure that the suspension system 1 remains in a raised position. In essence, the force exerted by spring 73 through distance d shown in FIGS. 6 and 7 are nearly inversely proportionable, such that when the moment about pivot pin 52 as a result of spring force 73 is calculated in accordance with the formula $M_o = F_{lift\ spring} \times d$, $M_o$ is similar when suspension system 1 is in the position in FIG. 6 and when in the position in FIG. 7.

Spring forces associated with lift spring 73 are thus relatively close when spring 73 is in the position shown in FIG. 6 and in FIG. 7. When moments are summed about pivot pin 52, in accordance with the equation: $\Sigma M_o = F_{lift\ spring}\ d - F_g S = 0$, the component $F_{lift\ spring}\ d$ is relatively constant, and inasmuch as the force of gravity $F_g$ is constant, distance S need only vary in an amount sufficient to offset the relatively small increase in $F_{lift\ spring}\ d$ as suspension system 1 moves to the position shown in FIG. 7. The summation of moments equation shown above thus indicates that inasmuch as $F_g$ is constant, the increasing force associated with $F_{lift\ spring}$ as suspension system 1 moves from the position shown in FIG. 6 to the position shown in FIG. 7, is offset by the decreasing distances d and S.

Accordingly, the improved vehicle suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle suspension system is constructed and used, the characteristics of the construction, and the advantageous, new and useful results obtained; the new and useful structures, devices, elements, arrangements, parts and combinations, are set forth in the appended claims.

I claim:

1. A suspension system for use with a vehicle having a frame and a given weight, the suspension system comprising:

a pair of spaced apart rigid control arms, each having an end and a pair of sidewalls;

pivot means attached to the control arm ends for providing pivotal movement of the control arms relative to the frame;

a stub axle rigidly mounted to and extending outwardly from each control arm on each control arm a spaced distance from the pivot means;

each stub axle being adapted for receiving a pneumatic tire, said pneumatic tire being exterior of the control arm sidewall;

a stabilizer beam extending between the control arms intermediate the pivot means and the stub axle; and support spring means for supporting the vehicle weight.

2. A suspension system as defined in claim 1 further comprising a lower beam attached to each stub axle and extending therebetween generally parallel to the stabilizer beam whereby the lower beam extends between the stub axles.

3. A suspension system as defined in claim 2 in which the support spring means is a pair of air springs mounted on the lower beam and adapted to engage the frame of the vehicle.

4. A suspension system as defined in claim 3 in which the air springs are mounted to the lower beam intermediate the stub axles.

5. A suspension system as defined in claim 2 in which the lower beam is formed with a hole adjacent each stub axle adapted for receiving a push rod of a brake assembly.

6. A suspension system as defined in claim 3 in which the lower beam is U-shaped having a horizontal section with a pair of ends, and a vertical portion extending upwardly from each of said ends; and in which each vertical portion is attached to a respective stub axle.

7. A suspension system as defined in claim 6 in which the air springs are mounted to the horizontal section of the lower beam intermediate the vertical portions.

8. A suspension system as defined in claim 1 further comprising lift means for raising and lowering the suspension between ground engaging and non-ground engaging positions, whereby said lift means operate through a first line of action, and in which the pivot means lies in a second line of action; in which the first line of action and the second line of action are spaced apart a first distance when the suspension system is in the non-ground engaging position and in which the first line of action and the second line of action are spaced apart a second distance when the suspension system is in the ground engaging position; and in which the second distance is smaller than the first distance.

9. A suspension system as defined in claim 8 in which the lift means is a spring creating a force; and in which the distance between the first line of action and the second line of action decreases as the spring force increases.

10. A suspension system as defined in claim 9 in which the spring moves from an expanded to a contracted position as the spring force increases; and in which the distance between the first line of action and the second line of action decreases as the spring moves from the expanded to the contracted position.

11. A suspension system as defined in claim 10 in which the pivot means lies in a first vertical line of action, and the force of gravity acts on the axle through a second vertical line of action extending substantially through the center of the axle, and in which the first vertical line of action and the second vertical line of action are spaced apart a first distance when the suspension system is in the non-ground engaging position, and in which the first vertical line of action and the second vertical line of action are spaced apart a second distance when in the ground engaging position, and in which the second distance is shorter than the first distance.

12. A suspension system as defined in claim 1 further comprising lift means for raising and lowering the suspension between ground engaging and non-ground engaging positions.

13. A suspension system as defined in claim 12 in which each lift means includes a force plate rigidly attached to the frame, a spring cup, and a coil spring having a first end and a second end; in which the first end of the coil spring bears against the force plate and the second end of said coil spring bears against the spring cup; and in which a lift bar is attached to the spring cup such that movement of the coil spring towards and away from the force plate moves the axle between ground engaging and non-ground engaging positions.

14. A suspension system as defined in claim 13 in which the lift bar extends at least partially through the coil spring; and in which a first end of the lift bar is attached to the spring cup and a second end of the lift bar is pivotally attached directly to the stabilizer beam.

15. A suspension system as defined in claim 12 in which the support spring means includes at least two air springs; and in which the air springs are fully inflated when the axle is in a first ground engaging position, is partially inflated for moving the axle to a second ground engaging position, and is substantially deflated for moving the axle to a non-ground engaging position.

16. A suspension system as defined in claim 14 further comprising a pair of brackets attached to said stabilizer beam, and in which a bolt extends through the brackets and said second end of said lift bar to provide movement therebetween.

17. A suspension system as defined in claim 1 in which each control arm includes a pair of mounting bosses integrally formed with said control arms; and in which each mounting boss is formed with a hole.

18. A suspension system as defined in claim 17 in which each of the pivot means includes a flexible bushing press-fitted into the hole of each mounting boss whereby deflection of said flexible bushing provides the only rotational movement between the frame and the control arms.

19. A suspension system for use with a vehicle having a frame, the suspension system comprising:
 a pair of spaced apart control arms, each having an end;
 pivot means attached to the control arm ends for providing pivotal movement of the control arms relative to the frame;
 a stub axle mounted on each control arm a spaced distance from the pivot means whereby the stub axles have a common central axis;
 a stabilizer beam extending between the control arms intermediate the pivot means and the stub axle;
 a lower beam attached to each stub axle and extending therebetween generally parallel to the stabilizer beam; and
 a pair of air springs mounted to the lower beam and adapted to axles and adapted to engage the frame of the vehicle whereby the central axis of the stub axle passes through the air springs.

20. A suspension system for use with a vehicle having a frame, the suspension system comprising:
 a pair of spaced apart control arms, each having an end;
 pivot means attached to the control arm ends for providing pivotal movement of the control arms relative to the frame;
 a stub axle mounted on each control arm a spaced distance from the pivot means;
 a stabilizer beam extending between the control arms intermediate the pivot means and the stub axle;
 a lower beam attached to each stub axle and extending therebetween generally parallel to the stabilizer beam;
 a pair of air springs mounted to the lower beam and adapted to engage the frame of the vehicle; and
 a central weldment extending between the lower beam and the stabilizer beam.

21. A suspension system as defined in claim 20 in which the central weldment attaches to the lower beam intermediate the air springs; and in which the center weldment attaches to the stabilizer beam intermediate the control arms.

22. A suspension system as defined in claim 21 in which the center weldment includes a pair of parallel and spaced apart sidewalls, a top wall and a bottom wall.

23. A suspension system as defined in claim 22 in which each control arm is formed with a hole; and in which the stabilizer beam is rigidly secured within said holes.

* * * * *